(12) United States Patent
Saitou

(10) Patent No.: US 7,852,273 B2
(45) Date of Patent: Dec. 14, 2010

(54) DISPLAY DEVICE

(75) Inventor: Yasuo Saitou, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 263 days.

(21) Appl. No.: 11/664,871

(22) PCT Filed: Sep. 2, 2005

(86) PCT No.: PCT/JP2005/016134

§ 371 (c)(1),
(2), (4) Date: Apr. 6, 2007

(87) PCT Pub. No.: WO2006/048972

PCT Pub. Date: May 11, 2006

(65) Prior Publication Data

US 2008/0088513 A1    Apr. 17, 2008

(30) Foreign Application Priority Data

Nov. 1, 2004   (JP) .............................. 2004-318109

(51) Int. Cl.
*H01Q 1/32* (2006.01)
*H01Q 1/24* (2006.01)
(52) U.S. Cl. ....................... 343/711; 343/702
(58) Field of Classification Search ................. 343/702, 343/711, 713, 846
See application file for complete search history.

(56) References Cited

U.S. PATENT DOCUMENTS

| | | | |
|---|---|---|---|
| 6,285,328 B1 | 9/2001 | Masaki et al. | |
| 6,342,858 B1 | 1/2002 | Dakeya et al. | |
| 6,509,877 B2 | 1/2003 | Masaki | |
| 7,043,209 B2 * | 5/2006 | Hirota | 455/101 |
| 2003/0148784 A1 | 8/2003 | Sawamura et al. | |
| 2004/0021608 A1 | 2/2004 | Kojima et al. | |
| 2004/0066342 A1 * | 4/2004 | Takaoka et al. | 343/711 |

FOREIGN PATENT DOCUMENTS

| | | |
|---|---|---|
| CN | 1212078 | 3/1999 |
| JP | 5-335826 A | 12/1993 |
| JP | 9-261749 A | 10/1997 |
| JP | 2000-172376 A | 6/2000 |
| JP | 2000-259295 A | 9/2000 |
| JP | 2001-16019 A | 1/2001 |
| JP | 2001-312339 A | 11/2001 |
| JP | 2002-84117 A | 3/2002 |
| JP | 2002-232220 A | 8/2002 |
| JP | 2002-368850 A | 12/2002 |
| JP | 2003-37538 A | 2/2003 |
| JP | 2003-110329 A | 4/2003 |
| JP | 2004-5653 A | 1/2004 |
| JP | 2004-236179 A | 8/2004 |
| JP | 2004-266681 A | 9/2004 |
| JP | 2006-50586 A | 2/2006 |

* cited by examiner

*Primary Examiner*—Shih-Chao Chen
(74) *Attorney, Agent, or Firm*—Birch, Stewart, Kolasch and Birch, LLP

(57) ABSTRACT

A plurality of antennas are arranged on the fringe of a monitor supported by a device body such that the antennas are located in a floating manner from a display surface and the central axis of these directional patterns is disposed in a vertical direction to the display surface; these antennas are enclosed within the outer frame; and further electroconductive members reflecting electric waves are located away from the antennas, to thus establish a virtual GND plane to be formed on the rear of an antenna.

4 Claims, 8 Drawing Sheets

DISPLAY DEVICE

TECHNICAL FIELD

The present invention relates to the display device of an integrated car navigation/audio system, for example, combining a car navigation function and an audio reproduction function, and further incorporating a hands-free call function via wireless communication with a portable telephone in a vehicle.

BACKGROUND ART

Conventionally, in portable information devices such as notebook personal computers, a high-frequency antenna has been disposed on the upper end of the monitor thereof so as to attain equal characteristics on both the display side and back sides thereof regardless of whether the monitor is opened or not. Further, the antenna portion is so arranged as not to project from the face of the monitor to give design consideration thereto.

However, unlike notebook personal computers, the monitors of integrated car navigation/audio systems do not have a sufficient free space in the monitor portion thereof. Therefore, the antenna has been disposed in the narrow free space thereof, and it is difficult to satisfy the antenna characteristics thereof. In particular, it is usual for an integrated car navigation/audio system to be provided by being fastened to a center console, and for the monitor portion thereof to be opened and closed for taking out the disk. In this respect, integrated car navigation/audio systems are significantly different from notebook personal computers.

(See patent documents 1 and 2, for example.)
Patent document 1: JP-A-2000-172376 (page 4, FIG. 1)
Patent document 2: JP-A-2004-5653 (page 4, FIGS. 1 to 3)

The conventional display device is arranged as mentioned above. As a result, it is necessary that the antenna portion thereof be disposed at a location where there is no obstacle and where the antenna can have a good reception. There is a problem that a high-frequency antenna particularly requires a sufficient free space because of its susceptibility to the interference of peripheral sheet-metal parts.

The present invention has been accomplished to solve the above-mentioned problem. An object of the present invention is to provide a display device capable of meeting limiting conditions for installing the antenna and attaining excellent transmit-receive characteristics even when the antenna is installed at a narrow mounting space.

DISCLOSURE OF THE INVENTION

The display device according to the present invention, includes an antenna means that is disposed on the fringe of the display surface of a display means such that the antenna means is located in a slightly floating manner from the display surface and the central axis of the directional pattern of the antenna means is disposed vertically with respect to the display surface.

According to the present invention, the display device included the antenna means that is disposed on the fringe of the display surface of the display means such that the antenna means is located in a floating manner or slightly forward isolated from the display surface and the central axis of the directional pattern of the antenna means is disposed in a vertical direction to the display surface. As a result, there is obtained an effect that the reception range of the antenna is enlarged by using a narrow space and the transmit-receive characteristics thereof can be enhanced.

BRIEF DESCRIPTION OF THE DRAWINGS

FIG. 7-1 is an explanatory diagram showing the directional pattern of the antenna provided in the display device at the transmit-receive time thereof.

FIG. 7-2 is an explanatory diagram showing the directional pattern of the antenna provided in the display device at the transmit-receive time thereof.

FIG. 7-3 is an explanatory diagram showing the directional pattern of the antenna provided in the display device at the transmit-receive time thereof.

FIG. 7-4 is an explanatory diagram showing the directional pattern of the antenna provided in the display device at the transmit-receive time thereof.

FIG. 8-1 is an explanatory diagram showing the directional pattern of the antenna provided in the display device at the transmit-receive time thereof.

FIG. 8-2 is an explanatory diagram showing the directional pattern of the antenna provided in the display device at the transmit-receive time thereof.

FIG. 8-3 is an explanatory diagram showing the directional pattern of the antenna provided in the display device at the transmit-receive time thereof.

FIG. 8-4 is an explanatory diagram showing the directional pattern of the antenna provided in the display device at the transmit-receive time thereof.

BEST MODE FOR CARRYING OUT THE INVENTION

Hereinafter, in order to describe this invention in more detail, the best mode for carrying out this invention will be described in accordance with the accompanying drawings.

Embodiment 1

Figure 1:
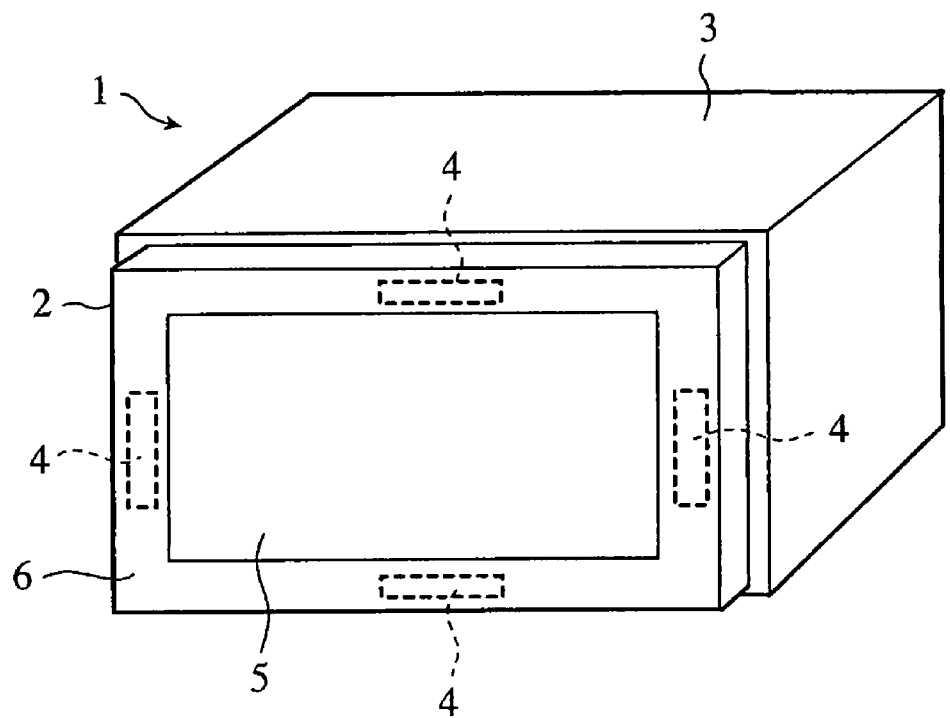
FIG. 1 is an oblique view showing the appearance of a display device in accordance with embodiment 1 of the present invention.

FIG. 1 is an oblique view showing the appearance of a display device in accordance with embodiment 1 of the present invention. The display device 1 as illustrated is an integrated car navigation/audio system composed of a monitor (display means) 2 and a device body 3, and including the function of hands-free telephone via wireless communication with a portable telephone in a vehicle, for example, in addition to car navigation and audio reproduction functions. This display device 1 is disposed such that the device body 3 is mounted within the center console in the vehicle, for instance, and the monitor 2 supported by the device body 3 faces toward the center of the vehicle interior, backing against the surface panel of the center console, for example.

In the display device 1 illustrated in FIG. 1, the monitor 2 is arranged at the front of the device body 3, and this monitor 2 is so supported as to open and close the front of the device body 3. The display device is arranged such that, for example, the monitor 2 is moved forward with rotation in order to move the front of the device body 3 to an open position, as described later, and a disk, card, or the like storing a map data and so on is inserted in the insertion portion (not depicted) provided on this front. The monitor 2 is equipped with an antenna 4 transmitting and receiving a high-frequency radio signal, and one or a plurality of antennas are disposed on the fringe of a display surface 5, for example. The display device illustrated in FIG. 1 has the antennas 4, one corresponding to each side of the fringe of the display surface 5 at the fringe portion of the casing forming the front of the monitor 2. As the plurality of antennas 4 thus provided therein, antennas of different transmit-receive frequency bands used for the wireless LAN and Bluetooth (registered trademark), for example, can be installed therein.

Figure 2:
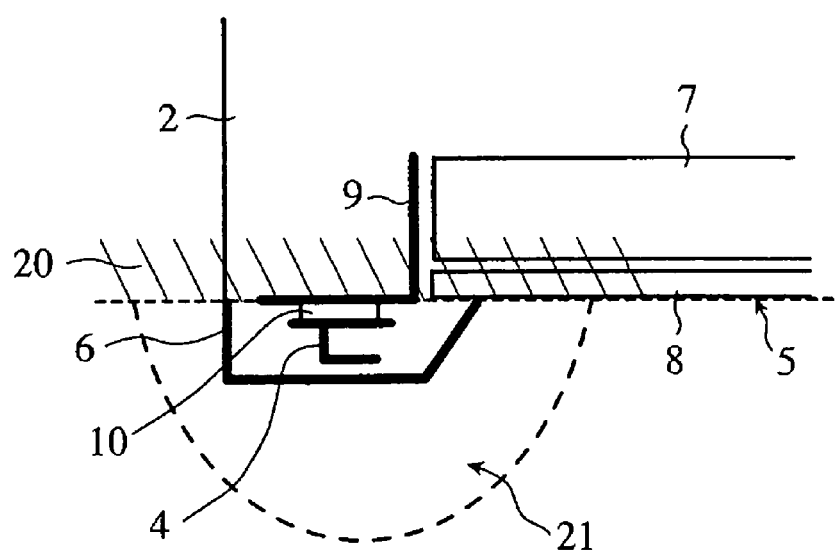
FIG. 2 is an explanatory diagram showing the structure of the antenna-mounting portion of the display device in accordance with embodiment 1.

FIG. 2 is an explanatory diagram showing the structure of the antenna-mounting portion of the display device in accordance with embodiment 1. This figure shows the rough structure of the fringe of the monitor 2, and the same parts as those denoted in FIG. 1 are designated by similar numerals, with the explanation thereof being omitted. This figure shows the arrangement of each member thereof as viewed from above the monitor 2. The monitor 2 is provided with, for example, a liquid crystal display (referred to as LCD hereinafter) 7 displaying the image thereon, and a touch panel 8 operated by the user and disposed on the side of the display surface of the LCD 7. The LCD 7 and the touch panel 8 are so provided and secured therein as to be embedded in the opening provided in the front of the casing of the monitor 2, and are further held from the front by an outer frame 6. The outer frame 6 is constructed in the form of a hollow or cavity as shown in FIG. 2, and has a U-shaped body slightly placed on the marginal ends of the LCD 7 and the touch panel 8. The antenna 4 is made up of sheet-metal antenna, for example, and is secured to the vicinity of the marginal end of the front of the casing of the monitor 2 through a mounting sheet metal 9 by a screw or adhesive tape. Further, the antenna is held in the cavity formed within the outer frame 6 when the outer frame 6 is fastened to the casing of the monitor 2. The outer frame 6 covers the antenna 4 and the like to prevent the exposition of the members having a projecting shape, thus preventing the injury of the user that can come in contact with the monitor 2 in the event that any vehicle accidents occur, for example.

The antenna 4 is attached in the casing of the monitor 2 by the L-shaped mounting sheet metal 9, for example, as shown in the figure, and is so fixed as to be located more forward than the front of the casing of the monitor 2 and the display surface 5 thereof. The mounting sheet metal 9 is fixed to the casing of the monitor 2, by screwing one side of the L-shaped one to the casing, for example, between the casing of the monitor 2 and the LCD 7, namely, in a lateral direction of the LCD 7. The antenna 4 is secured to the mounting sheet metal 9 with a screw, adhesive tape, or the like. In this case, the antenna may be fixed thereto through an insulating member 10. Further, the antenna 4 is so disposed as to be oriented in a direction normal to the display surface 5; specifically, the central axis of the directional pattern of the antenna 4 is oriented in a direction vertical or perpendicular to the display surface 5.

When the antenna 4 is disposed more forward than the surface of the touch panel 8, that is, the display surface 5, as shown in FIG. 2, the display surface 5 and the front of the casing of the monitor 2 which are located behind the antenna 4 can be regarded as a virtual GND plane 20 shaded as shown in the figure. Because this GND plane 20 is located behind the antenna 4, the transmitted radio waves that are radiated forward from the antenna 4 and the range where the antenna 4 can receive radio waves are widely expanded, thus enlarging a transmit-receive range 21. In addition, this transmit-receive range 21 spreads out generally concentrically around the antenna 4, and expands more widely than the range as shown in FIG. 2.

Figure 3:
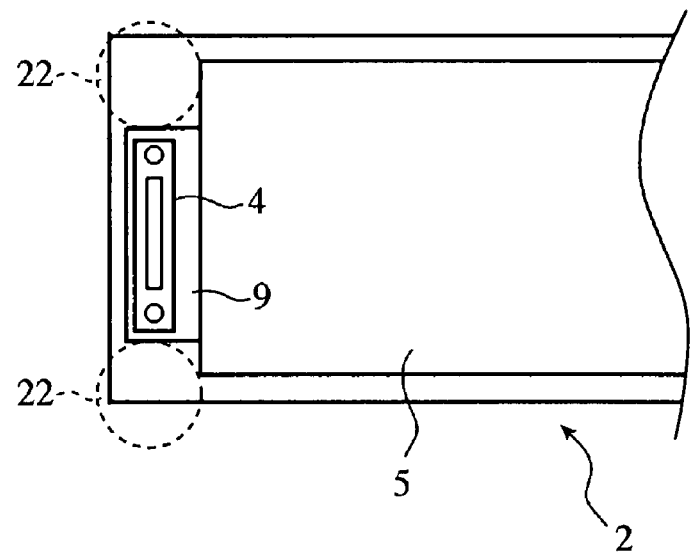
FIG. 3 is a front view of the antenna-mounting portion of the display device in accordance with embodiment 1.

FIG. 3 is a front view of the antenna-mounting portion of the display device in accordance with embodiment 1. The same parts as those denoted in FIG. 1 and FIG. 2 are designated by similar numerals, and the explanation thereof is omitted. This figure is a view of the display device in which the antenna 4 is mounted on the fringe of the display surface 5 of the monitor 2 in a floating way from the display surface 5 through the mounting sheet metal 9, as viewed from the front of the monitor 2.

The mounting sheet metal 9 has a mounting area that is of approximately the same size and shape as the mounting space of the antenna 4 as shown in FIG. 3, and the sheet metal is so formed as to prevent the radio wave backward radiated by the antenna 4 from reflecting. When viewed from the front of the antenna 4 in a state where the antenna is mounted on the casing of the monitor 2, the mounting sheet metal 9 comes to be almost or preferably completely hidden behind the antenna 4. The antenna-mounting portion is constructed by using the mounting sheet metal 9 of such shape, locating a member reflecting a radio wave away from the area 22 forming the periphery of the antenna 4, and placing the antenna spaced from conductive members.

Figure 4:
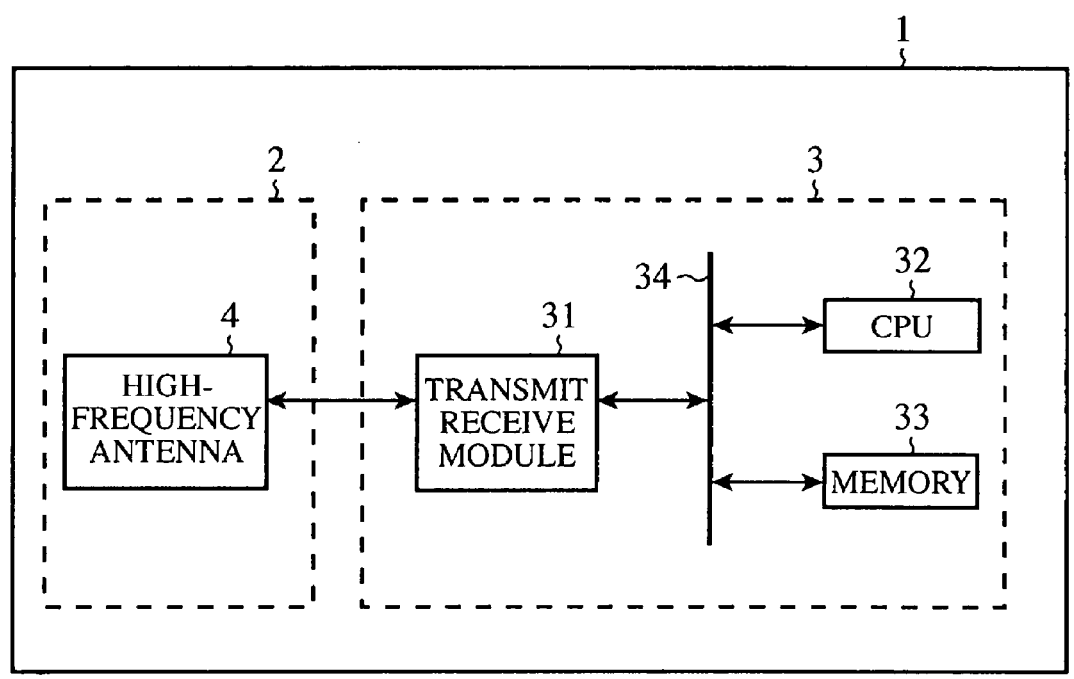
FIG. 4 is a block diagram showing the configuration of the main part of the display device in accordance with embodiment 1.

FIG. 4 is a block diagram showing the other configuration that includes the main part of the display device in accordance with embodiment 1. The same parts as those denoted in FIG. 1 are designated by similar numerals, and the explanation thereof is omitted. The monitor 2 is provided with the antenna 4. The device body 3 is equipped with a transmit-receive module 31 that transmits and receives a radio signal by using the antenna 4, a CPU 32 composed of a processor and the like that controls the operation of the transmit-receive module 31, and a memory 33 storing the control data, which is used by the CPU 32, and the data concerning the operation of the display device 1.

Figure 5:
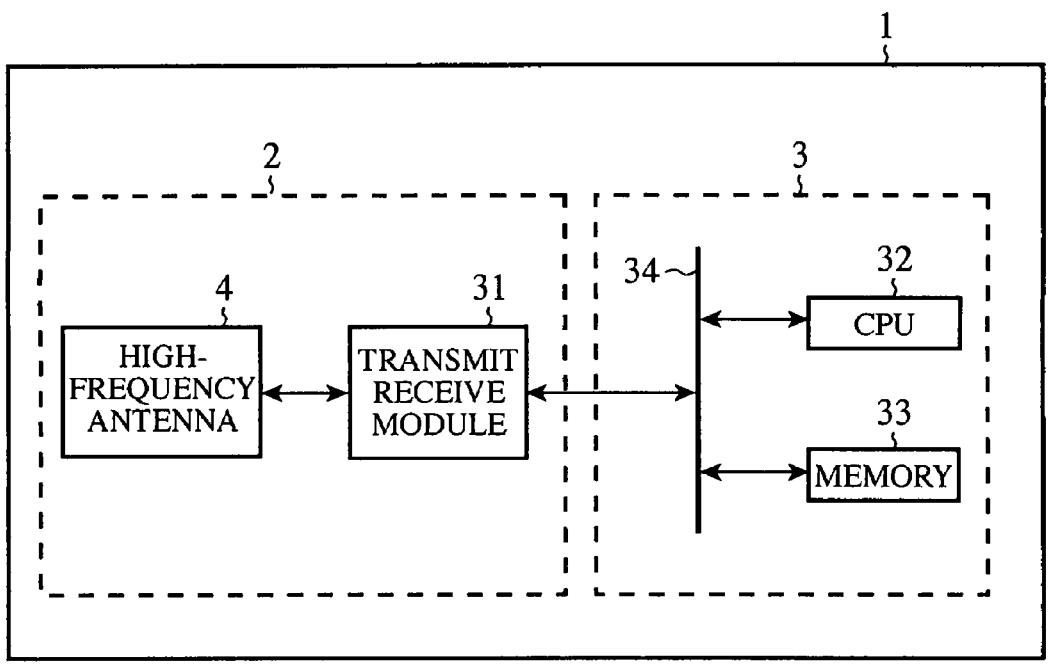
FIG. 5 is a block diagram showing the other configuration that includes the main part of the display device in accordance with embodiment 1.

FIG. 5 is a block diagram showing the other configuration that includes the main part of the display device in accordance with embodiment 1. The same parts as those denoted in FIG. 4 or the parts corresponding thereto are designated by similar numerals, and the explanation thereof is omitted. In the display device shown in FIG. 5, the monitor 2 is provided with the transmit-receive module 31 together with the antenna 4, and the device body 3 is provided with the CPU 32 and the memory 33.

Figure 6:
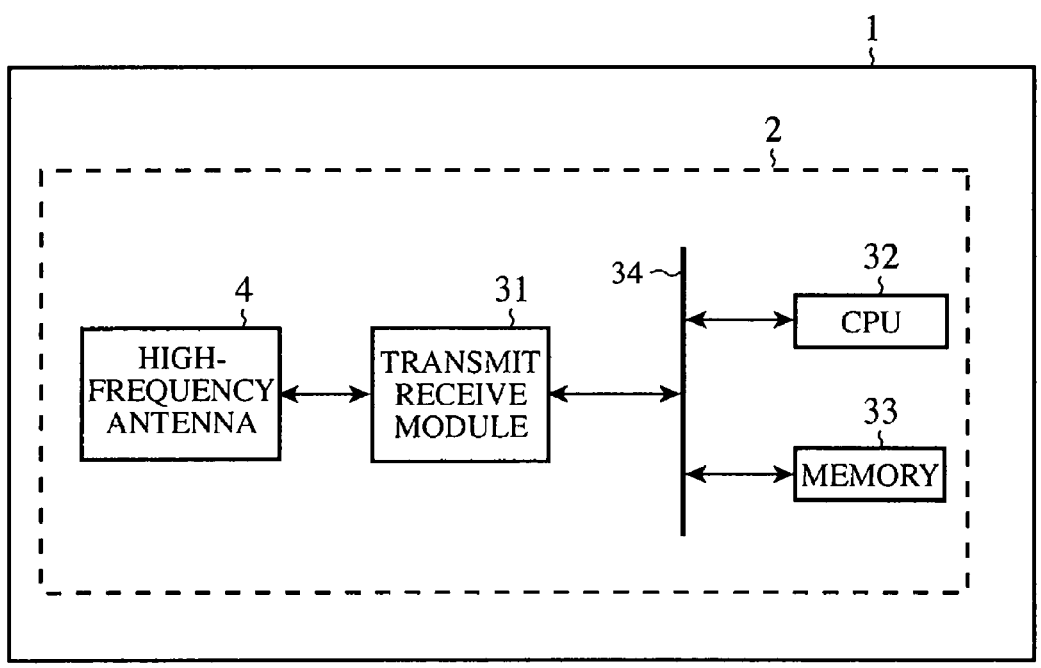
FIG. 6 is a block diagram showing the other configuration that includes the main part of the display device in accordance with embodiment 1.

FIG. 6 is a block diagram showing the other configuration that includes the main part of the display device in accordance with embodiment 1. The same parts as those denoted in FIGS. 4 and 5 or the parts corresponding thereto are designated by similar numerals, and the explanation thereof is omitted. In the display device as shown in FIG. 6, the monitor 2 is provided with the antenna 4, the transmit-receive module 31, the CPU 32 and the memory 33.

In addition, FIGS. 4 to 6 illustrate some of constituent elements to be operated when communication on the wireless LAN, Bluetooth (registered trademark), and so on is performed, and the diagrammatic representation is omitted with respect to the constituent elements to be used for other operations, for instance, the constituent elements to be operated when the audio reproduction function or car navigation function is used.

As mentioned above, the antenna 4 made up of a sheet metal antenna is connected to the transmit-receive module 31, for example, with a coaxial cable (not depicted). When the sheet metal antenna is arranged to be connected to the transmit-receive module 31 with a coaxial cable, it is possible to secure the antenna 4 to a narrow space such as the fringe of the monitor 2 and also it becomes easier to dispose the antenna within the outer frame 6 in comparison with the case where a small antenna is mounted on a substrate, wiring is made thereto, and the substrate is fixed on the casing. Furthermore, the antenna 4 is constructed by use of a flat antenna, and thereby the whole monitor 2 containing the outer frame 6 may be constructed in a thin-type one.

The operation thereof will now be described as below.

Here, out of the operational functions of the display device 1, the operations of the constituent elements thereof carrying out communications by means of the wireless LAN in vehicle and Bluetooth (registered trademark) will now be described, and the explanation of the operations of the other functions is omitted. The display devices 1 as shown in FIGS. 4 to 6, respectively, operate in a similar manner. For example, when the display device 1 carries out data communication with another device by means of the wireless LAN in the vehicle equipped with the display device 1, more specifically, when the CPU 32 of the display device 1 transmits the data stored in the memory 33, for example, to another device (not shown) connected thereto by the LAN, the CPU transmits the data read from the memory 33 through a data bus 34 to the transmit-receive module 31. The CPU 32 subsequently controls the operation of the transmit-receive module 31 to modulate the data input from the memory 33 to a high frequency signal, and causes the module to transmit the signal by using the antenna 4.

Moreover, for example, when receiving a high frequency signal from another device (not shown) connected thereto by the wireless LAN, the transmit-receive module 31 controlled in the reception state by the CPU 32, for example, receives a high frequency signal by using the antenna 4, and the transmit-receive module 31 demodulates the high frequency signal to output the communication data. The CPU 32 controls, for instance, the transmit-receive module 31 and the memory 33, transmits the communication data demodulated by the transmit-receive module 31 to the memory 33 through the data bus 34 to be stored.

The antenna 4 is used to transmit and receive the communication data thus modulated to the high frequency signal, and the antenna excellently transmits and receives the communication data of the radio signal and so on, because the rear of the antenna 4 can be regarded as the GND plane 20 as mentioned above.

Figures 1, 7:
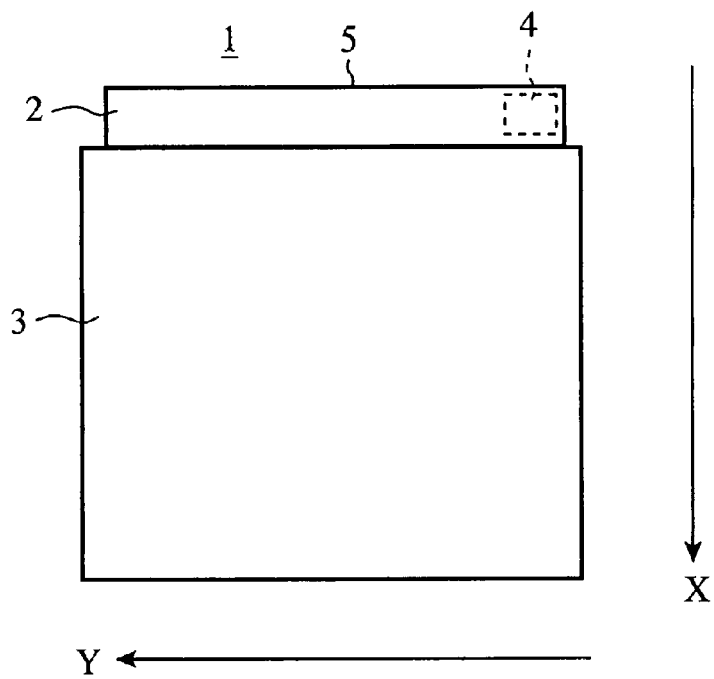
Figures 2, 7:
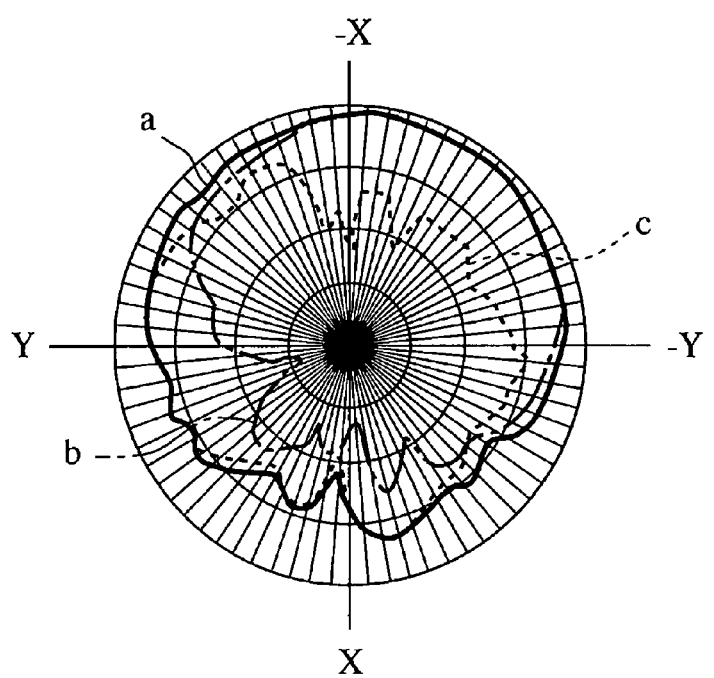
Figures 3, 7:
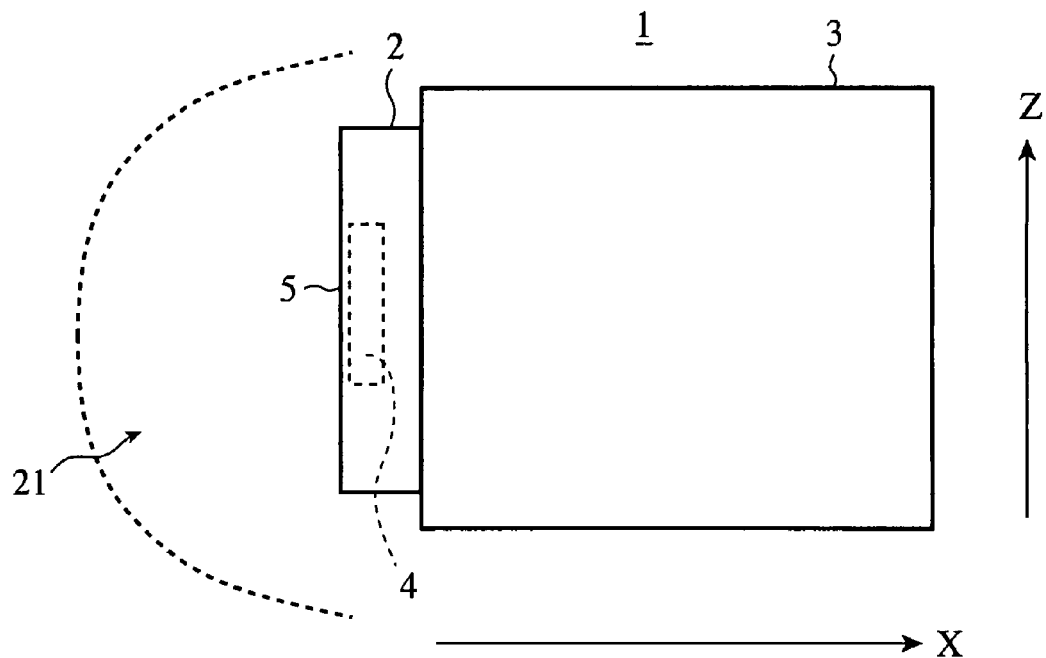
Figures 4, 7:
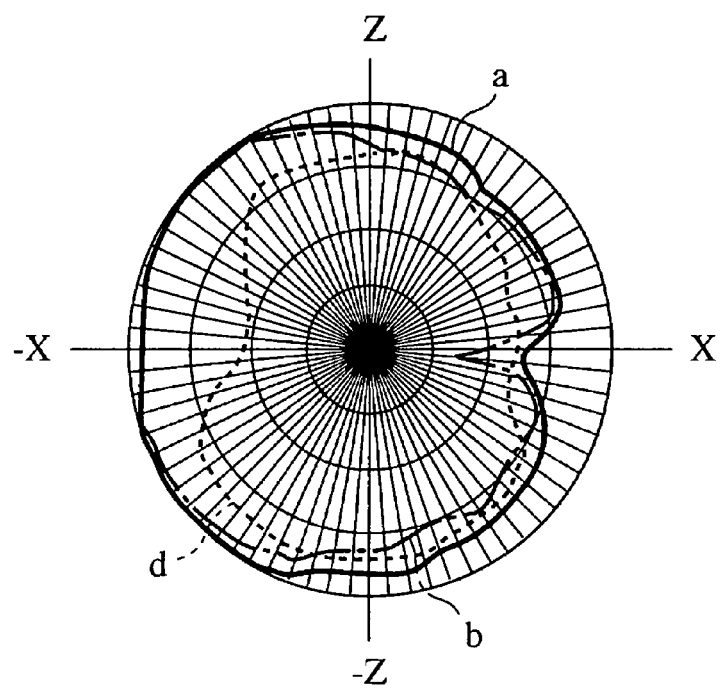

FIGS. 7-1 to 7-4 and FIGS. 8-1 to 8-4 are explanatory diagrams showing the directional patterns at the transmit-receive time with respect to the antenna provided in the display device. The same parts as those denoted in FIGS. 1 and 2 or the parts corresponding thereto are designated by similar numerals, and the explanation thereof is omitted. FIG. 7-1 shows the appearance of the display device 1 in the state where the monitor 2 is closed, that is, the state where the user is seeing the navigation map, for example, with the monitor 2, and the figure shows the arrangement of the monitor 2 and the device body 3 when the display device 1 mounted on the center console in a vehicle is viewed from the top. FIG. 7-2 is a graph showing the directional pattern at the transmit-receive time with respect to the antenna 4 provided in the monitor 2 existing in the state where the monitor 2 is closed. The graph of FIG. 7-2 shows the characteristics such as radiation at the transmitting time, and gain at the receiving time by use of the XY coordinates, and shows one example of the characteristic obtained at a randomly chosen point on the front of the display device 1 mounted on the center console when the X direction and Y direction indicated by the arrows in FIG. 7-1 are fixed with respect to the display device 1 and the positional relationship is demonstrated by using these XY directions. In the figure, the solid line a shows the characteristic obtained by combining the characteristic in the horizontal plane and the characteristic in the vertical plane, the long dashed line b shows the characteristic in the vertical plane, and the dashed line c shows the characteristic in the horizontal plane.

In addition, one antenna 4 is shown in FIG. 7-1; however, a plurality of antennas may be provided therein as shown in FIG. 1, and the number of antennas 4 equipped in the monitor 2 is not restricted by the number thereof illustrated in FIG. 7-1.

FIG. 7-3 shows the arrangement of the monitor 2 and the device body 3 when the display device 1 in the state in which the monitor 2 is closed similarly to FIG. 7-1 is viewed from the lateral side thereof. FIG. 7-4 is a graph showing the directional pattern at the transmit-receive time with respect to the antenna 4 existing in the state where the monitor 2 is closed. The graph of FIG. 7-4 shows the characteristics such as radiation at the transmitting time, and gain at the receiving time by use of the XZ coordinates, and shows one example of the characteristic obtained at an arbitrarily chosen point on the lateral side of the display device 1 mounted on the center console when the X direction and the Z direction indicated by the arrows in FIG. 7-3 are fixed with respect to the display device 1 and the positional relationship is shown by using these X and Z directions. In the figure, the solid line a shows the characteristic obtained by combining the characteristic in the horizontal plane and the characteristic in the vertical plane, the long dashed line b shows the characteristic in the horizontal plane, and the dashed line d shows the characteristic in the vertical plane.

In addition, one antenna 4 is shown in FIG. 7-3; however, a plurality of antennas may be provided therein as shown in FIG. 1, and the number of antennas 4 equipped in the monitor 2 is not limited by the number thereof shown in FIG. 7-3. Moreover, the characteristic shown in the graph of FIG. 7-4 is not necessarily the characteristic of the antenna 4 disposed at the position shown in FIG. 7-3.

Figures 1, 8:
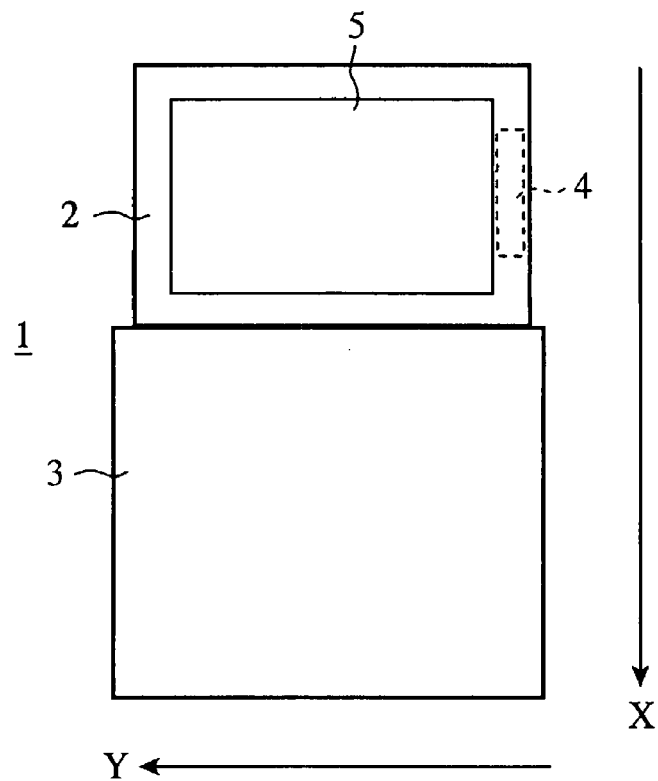
Figures 2, 8:
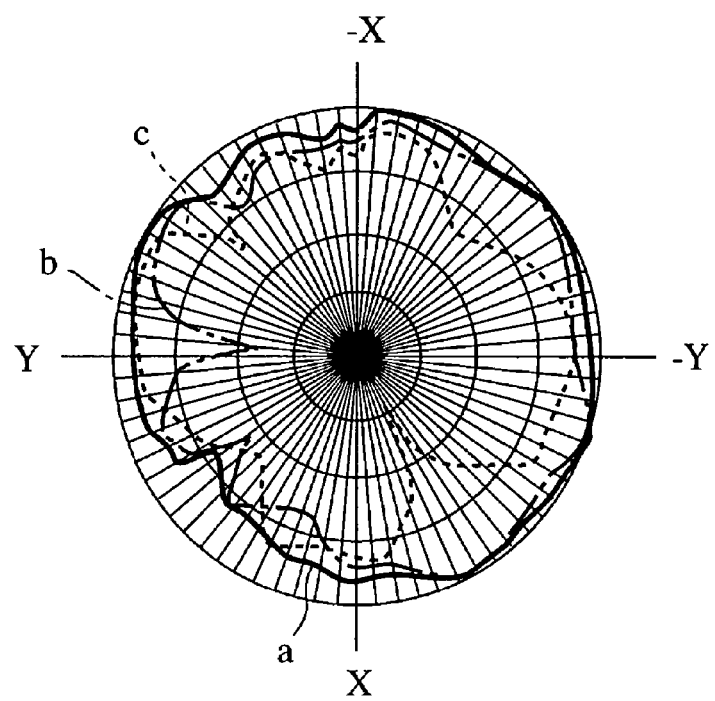
Figures 3, 8:
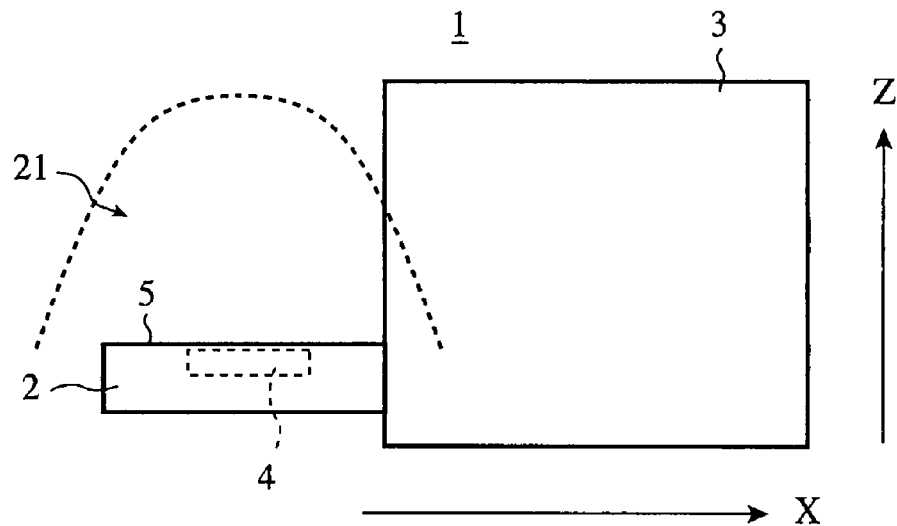
Figures 4, 8:
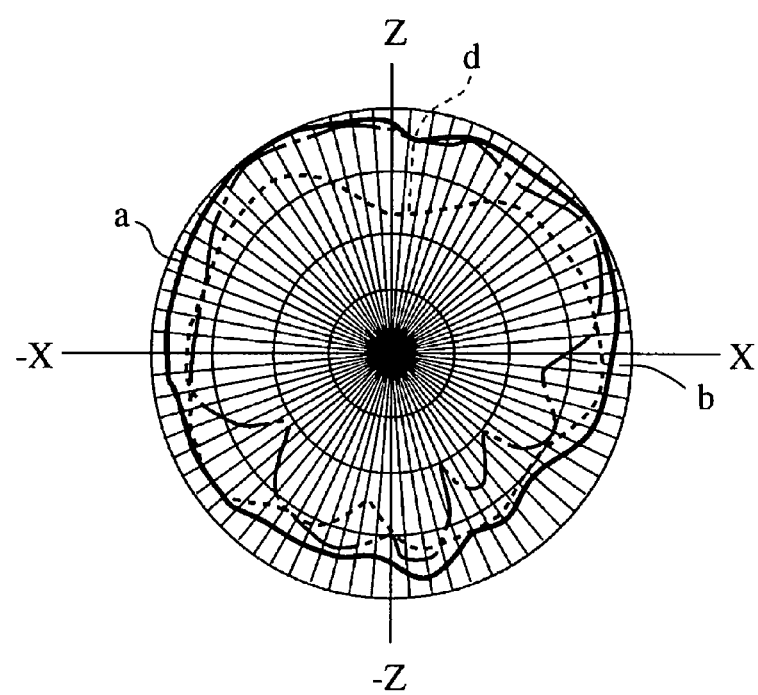

FIG. 8-1 shows the state in which the monitor 2 is opened, specifically, the state in which the user opens the monitor 2 to expose the front of the device body 3 (not shown). This state is the one in which the following operations are performed: for example, insertion or takeout of a medium such as disk or card into or from the insertion portion provided in the front of the device body 3. Further, the figure shows the arrangement of the monitor 2 and the device body 3 when the display device 1 mounted on the center console in a vehicle is viewed from the top. The state of the display device 1 as shown in FIGS. 8-1 and 8-3 shows the one in which the monitor 2 is slid from the state as shown in FIGS. 7-1 and 7-3 in the X direction. In detail, in FIG. 7-3, the bottom end of the monitor 2 therein moves leftward; the top end of the monitor 2 simultaneously moves toward the lower portion of the device body 3; the monitor 2 turns clockwise 90 degree; and in FIG. 8-3, the monitor opens the display surface 5 upward, that is, toward the Z direction, FIG. 8-3 showing the opening state of the monitor.

FIG. 8-2 is a graph showing the directional pattern at the transmit-receive time with respect to the antenna 4 provided in the monitor 2 in the state where the monitor 2 is opened. The graph of FIG. 8-2 shows the characteristics such as radiation at the transmitting time and gain at the receiving time by use of the XY coordinates, and shows one example of the characteristics obtained at an arbitrarily chosen point on the front of the display device 1 mounted on the center console when the X direction and Y direction indicated by the arrows in FIG. 8-1 are fixed with respect to the display device 1 and the positional relationship is demonstrated by using these X and Y directions. In the figure, the solid line a shows the characteristic obtained by combining both characteristics in the horizontal and vertical planes, the long dashed line b shows the characteristic in the horizontal plane, and the dashed line c shows the characteristic in the vertical plane.

In addition, only one antenna 4 is shown in FIG. 8-1; however, a plurality of antennas may be provided therein as shown in FIG. 1, and the number of antennas 4 equipped in the monitor 2 is not limited by the number thereof illustrated in FIG. 8-1. Moreover, the characteristic shown in the graph of FIG. 8-2 is not necessarily the characteristic of the antenna 4 disposed at the position shown in FIG. 8-1.

FIG. 8-3 shows the arrangement of the monitor 2 and the device body 3 when the display device 1 in the state in which the monitor 2 is opened similarly to FIG. 8-1 is viewed from the lateral side thereof in the state in which the display device is mounted on the center console. FIG. 8-4 is a graph showing the directional pattern at the transmit-receive time with respect to the antenna 4 in the state where the monitor 2 is opened. The graph of FIG. 8-4 shows the characteristics such as radiation at the transmitting time and gain at the receiving time by use of the XZ coordinates, and shows one example of the characteristics obtained at a randomly chosen point on the lateral side of the display device 1 mounted on the center console when the X direction and Z direction indicated by the arrows in FIG. 8-3 are fixed with respect to the display device 1 and the positional relationship is demonstrated by using these X and Z directions. In the figure, the solid line a shows the characteristic obtained by combining the characteristic in the horizontal plane and the characteristic in the vertical plane, the long dashed line b shows the characteristic in the horizontal plane, and the dashed line d shows the characteristic in the vertical plane.

Additionally, only one antenna 4 is shown in FIG. 8-3; however, a plurality of antennas may be provided therein as shown in FIG. 1, and the number of antennas 4 equipped in the monitor 2 is not limited by the number thereof illustrated in FIG. 8-3.

A comparison of FIG. 7-2 with FIG. 8-2 each showing the characteristic of the display device 1 in the front thereof and a comparison of FIG. 7-4 and FIG. 8-4 each showing the characteristic of the display device 1 in the lateral side indicate that there is not a great difference of the characteristic of the antenna 4 installed in the monitor 2 between the state in which the monitor 2 of the display device 1 is closed and the state in which the monitor thereof is opened. Thus, in either of these two states, the communication signal of the high frequency radio wave can be similarly transmitted and received.

As mentioned above, in accordance with embodiment 1, the antenna 4 is so disposed at the marginal end of the front of the casing of the monitor 2 as to be located more forward than the members disposed in the front thereof, that is, the antenna 4 is so disposed as to be positioned in a floating manner (or isolated) from the display surface 5. As a result, the rear of the antenna 4 can be regarded as the virtual GND plane 20, and there is obtained an effect that the transmit-receive characteristic of the antenna 4 can be enhanced.

Moreover, there is obtained an effect that the transmit-receive characteristic thereof becomes excellent because it is arranged that conductive members be not disposed at the surroundings of the antenna 4, thus eliminating the influence of the reflection of the electric wave.

Further, there is an effect that the restrictions is relaxed, imposed on the shape of the electroconductive member such as the bracket disposed behind the antenna 4 because the rear of the antenna can be regarded as the virtual GND plane 20.

Further, because the antenna 4 is disposed in a floating manner from the display surface 5, there is achieved an effect that a stable transmit-receive characteristic can be obtained without being influenced by the LCD 7, the touch panel 8, and the mounting sheet metal 9 and furthermore, a sufficiently wide range of transmission and reception can be obtained.

Further, the antenna 4 is disposed in a floating way from the display surface 5, there is an effect that an excellent transmit-receive characteristic can be obtained in either of the state in which the monitor 2 is opened and the state in which the monitor is closed.

Further, the mounting sheet metal 9 is arranged to have the same shape as that of the antenna 4 mounted thereon, as viewed from the front of the sheet metal, thus enabling the reflection of the electric wave to be reduced. As a result, there is an effect that the transmit-receive characteristic of the antenna 4 can be enhanced.

Further, the display device is provided with the antennas 4 of different transmit-receive frequency bands, and thereby the device can perform a plurality of types of radio wave communications. There is obtained an effect that the display device can transmit and receive radio signals with other devices using the wireless LAN, Bluetooth (registered trademark), or the like.

Embodiment 2

Figure 9:
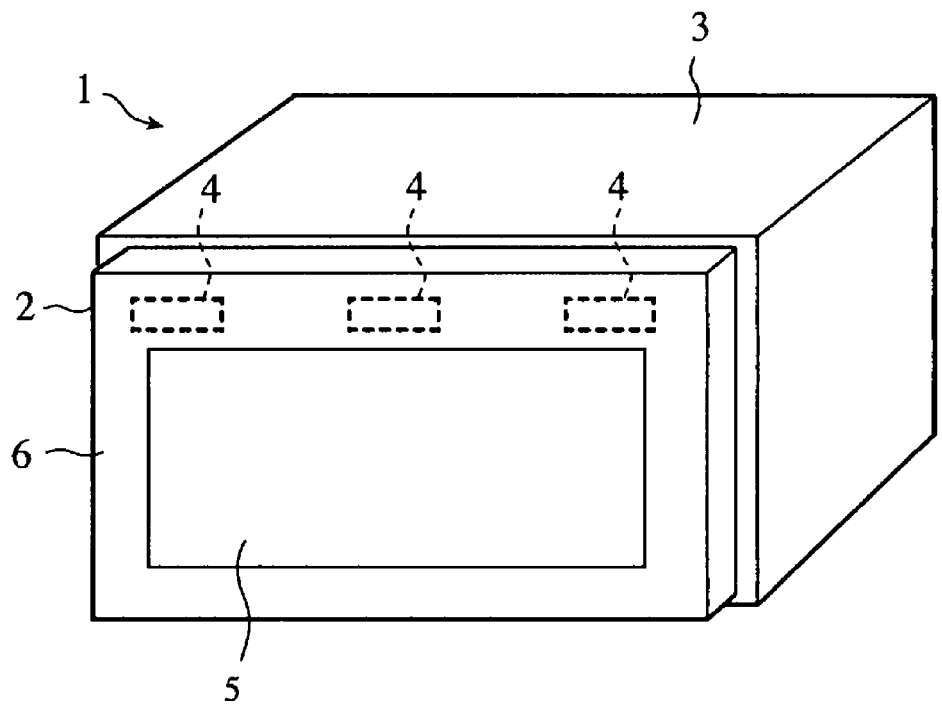
FIG. 9 is an oblique view showing the structure of a display device in accordance with embodiment 2 of the present invention.

FIG. 9 is an oblique view showing the structure of a display device in accordance with embodiment 2 of the present invention. The same parts as those denoted in FIG. 1 or the parts corresponding thereto are designated by similar numerals, and the explanation thereof is omitted. Here, the structure constituting the feature of the display device in accordance with embodiment 2 will now be described.

The display device 1 as shown in FIG. 9 is arranged such that a plurality of antennas 4 are disposed in one side of the fringe of the monitor 2 and these antennas 4 are covered by the outer frame 6. The area forming one side of the front of the casing of the monitor 2 is provided with three antennas 4, at equal intervals, which transmit and receive in the same frequency band, for example. However, as regards the intervals between the antennas, the intervals do not have to be equal, depending on the characteristics thereof. Except for the features mentioned above, the display device in accordance with embodiment 2 is arranged similarly to the device in accordance with embodiment 1.

The operation thereof will now be described below.

Here, the explanation of the operations of the display device similar to those of the device in accordance with embodiment 1 is omitted, and the operations thereof constituting the feature of the display device in accordance with embodiment 2 will be described.

As mentioned above, one side of the marginal end of the casing of the monitor 2, that is, one side of the fringe of the display surface 5 is provided with the antennas 4, at equal intervals, having the same transmit-receive frequency band, and thereby, the range in which the display device can transmit and receive is expanded. The display device shown in the figure is provided with three antennas 4, equally spaced, in each side of the outer frame 6, thus expanding its transmit-receive range. In addition, the number of sides of the fringe of the display surface 5 where the antennas 4 are disposed at equal intervals is not limited to one. Furthermore, a plurality of antennas 4 which are of different transmit-receive frequency bands may be similarly disposed to carry out several types of radio communications such as the wireless LAN, Bluetooth (registered trademark), or the like.

As mentioned above, in accordance with embodiment 2, a plurality of antennas 4 having the same transmit-receive frequency band are provided equally spaced in the fringe of the monitor 2. As a result, there is obtained an effect that the transmit-receive range thereof can be expanded.

Further, a plurality of antennas 4 of different transmit-receive frequency bands are provided therein, and thereby, there is obtained an effect that a plurality of types of radio wave communications such as the wireless LAN, Bluetooth (registered trademark), or the like can be carried out.

Embodiment 3

Figure 10:
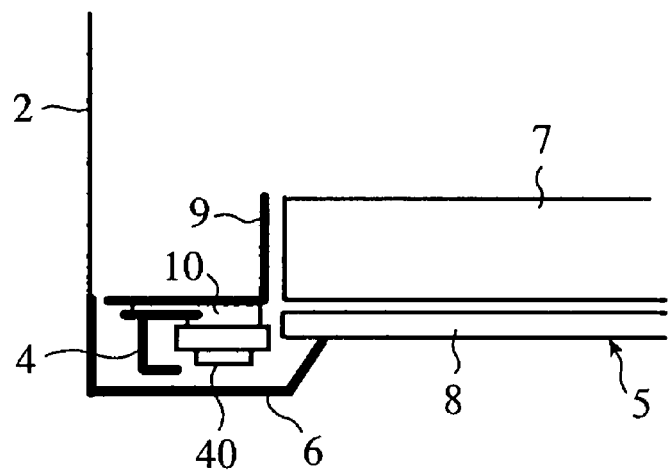
FIG. 10 is an explanatory diagram showing the structure of the antenna-mounting portion of a display device in accordance with embodiment 3 of the present invention.

FIG. 10 is an explanatory diagram showing the structure of the monitor of a display device in accordance with embodiment 3 of the present invention. The same parts as those denoted in FIG. 2 or the parts corresponding thereto are designated by similar numerals, and the explanation thereof is omitted. This figure shows the arrangement of each member thereof when the monitor 2 is viewed from the top, similarly to FIG. 2. The explanation of the parts arranged similarly to that described in embodiment 1 is omitted, and the structure constituting the feature of the display device in accordance with embodiment 3 will be described below.

The monitor 2 as shown in FIG. 10 is provided with a switch substrate 10 together with an antenna 4 within an outer frame 6. This switch substrate 10 has a push-button switch setting the operation of the display device 1. When the switch substrate 10 is thus provided therein, the antenna 4 is provided such that the front end of the antenna 4 is disposed more forward than the outermost location of the forward projecting portion of the switch substrate 10, for example, the outermost location of the push button.

A flat antenna or the equivalent may be used as the antenna 4 to easily dispose the switch substrate 10 within the outer frame 6, and further, the monitor 2 may has a beautiful design by modifying the shape of the outer frame 6.

The display device in accordance with embodiment 3 operates similarly to the one in embodiment 1, and the explanation of the operation thereof is omitted here.

As shown in FIG. 10, the antenna 4 is so disposed as to be located more forward than the outermost portion of the switch substrate 10, thus bringing about the operational effect similar to that described in embodiment 1.

As mentioned above, in accordance with embodiment 3, there is obtained an effect that an excellent transmit-receive characteristic can be obtained because the antenna 4 is disposed more forward or front than the switch substrate 10.

Further, there is obtained an effect that the design of the monitor 2 can be provided with a sense of beauty because the display device is arranged by using the flat antenna as the antenna 4.

The display device 1 recited thus far is arranged such that the monitor 2 is opened and closed with respect to the device body 3; however, even in the display device 1 in which the monitor 2 is fixed to the device body 3, there is achieved a similar operational effect by similarly disposing the antenna 4 to arrange the monitor 2.

INDUSTRIAL APPLICABILITY

As stated hereinabove, the display device according to the present invention is suitable for obtaining an excellent transmit-receive characteristic even when the antenna is provided in a narrow mounting space.

The invention claimed is:

1. A display device having a display unit and a wireless transmit-receive unit, the display device comprising:
    a casing surrounding the front of the display unit;
    an antenna disposed so as to be positioned in front of a display surface of the display unit; and
    the central axis of the directional pattern of the antenna is disposed in a vertical direction to the display surface,
    wherein the display unit includes a hollow outer-frame member positioned over the front of said casing, and the antenna is disposed between the interior of the outer-frame member and the front of the casing.

2. A display device according to claim 1, wherein the display unit is arranged at an equal interval with a plurality of antennas that perform a transmit-receive in the same frequency band.

3. A display device according to claim 1, wherein the display unit is provided with a plurality of antennas that perform a transmit-receive in different frequency bands.

4. A display device according to claim 1, the device further comprising an insulating member disposed between said casing and said antenna.

* * * * *